United States Patent [19]
Hamnes

[11] 3,756,509
[45] Sept. 4, 1973

[54] GRANULATE SPREADER APPARATUS

[76] Inventor: Raymond C. Hamnes, 475 Ositos Ave., Sunnyvale, Calif.

[22] Filed: June 12, 1972

[21] Appl. No.: 261,901

[52] U.S. Cl. ................ 239/675, 239/661, 239/664, 239/676, 239/678
[51] Int. Cl. ........................................ E01c 19/20
[58] Field of Search .................. 239/661, 664, 672, 239/675, 676, 678

[56] References Cited
UNITED STATES PATENTS

| | | | |
|---|---|---|---|
| 1,623,743 | 4/1927 | McGuiness | 239/664 X |
| R24,920 | 1/1961 | Palmer | 239/675 X |

FOREIGN PATENTS OR APPLICATIONS

| | | | |
|---|---|---|---|
| 739,334 | 7/1966 | Canada | 239/664 |
| 107,323 | 5/1967 | Denmark | 239/675 |
| 107,585 | 6/1967 | Denmark | 239/675 |
| 12,030 | 0/1899 | Great Britain | 239/672 |
| 906,307 | 9/1962 | Great Britain | 239/675 |
| 420,703 | 3/1967 | Switzerland | 239/676 |

*Primary Examiner*—Robert S. Ward, Jr.
*Attorney*—Thomas E. Schatzel et al.

[57] ABSTRACT

Spreader apparatus for uniformly spreading granulate matter, e.g., sand or gravel, over a given extended surface. The apparatus includes a base support; a bulk hopper engaged to the base support for carrying a bulk supply of granulate matter to be distributed over said given surface; an elongated housing engaged to the bulk hopper and projecting laterally from the hopper above said given surface, the housing forming an elongated trough for receiving a supply of granulate matter; passage means about one end of said trough and extending intermediate the interior of the bulk hopper and said trough to permit granulate matter to flow from the bulk hopper to said trough; an elongated conveyor screw supported within the trough and extending end-to-end of said trough, the screw being rotatable within the trough about a common longitudinal axis, the screw including a plurality of laterally spaced tapered flights for conveying granulate matter received through the passage means to within said trough; an elongated rotational roller means supported by said elongated housing beneath said conveyor screw and above said given surface, the axis of rotation of the roller being parallel with said common longitudinal axis; control gate means engaged to the elongated housing and positioned intermediate the conveyor screw and the roller for controlling the rate of feed of particulate matter from said elongated trough to the surface of the elongated roller; and drive means for driving said conveyor screw rotationally about said common longitudinal axis and for driving said roller means rotationally about its axis.

21 Claims, 6 Drawing Figures

FIG. 5A
FIG. 5B
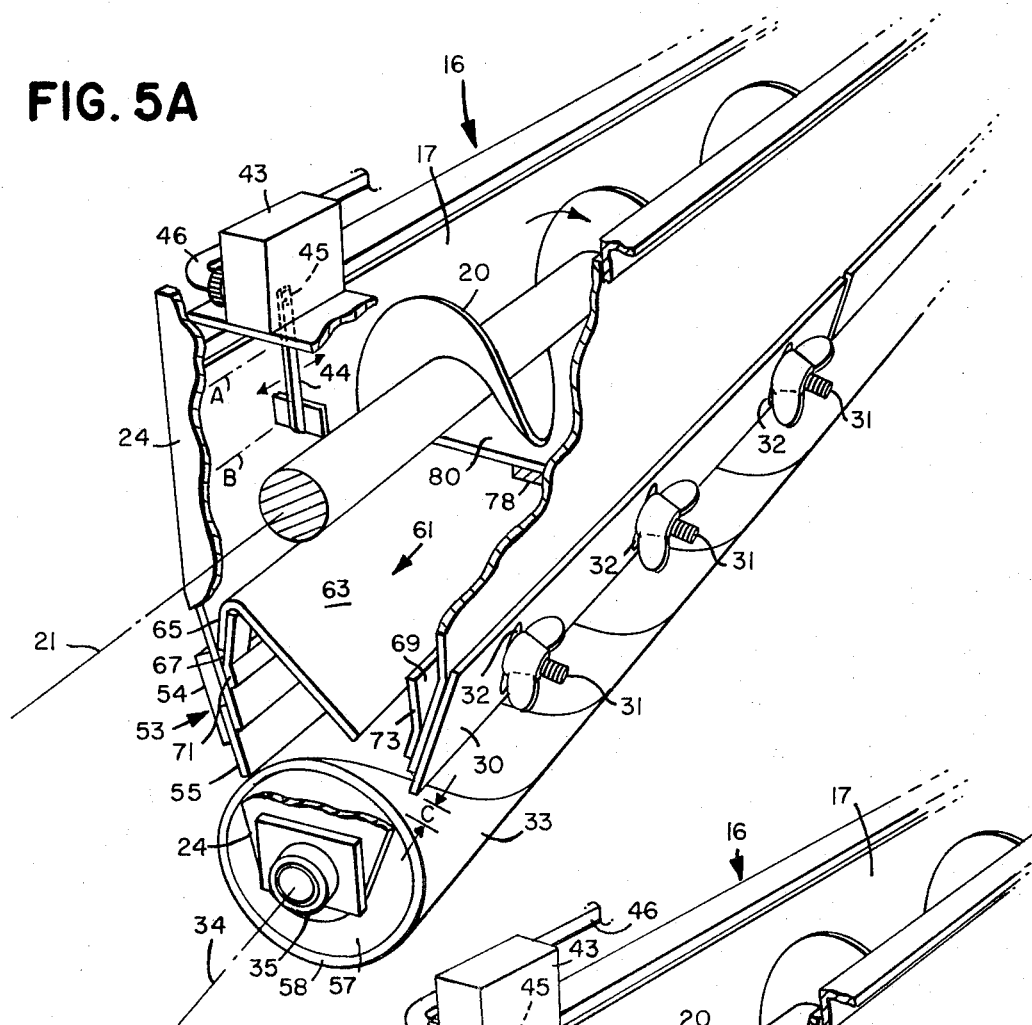
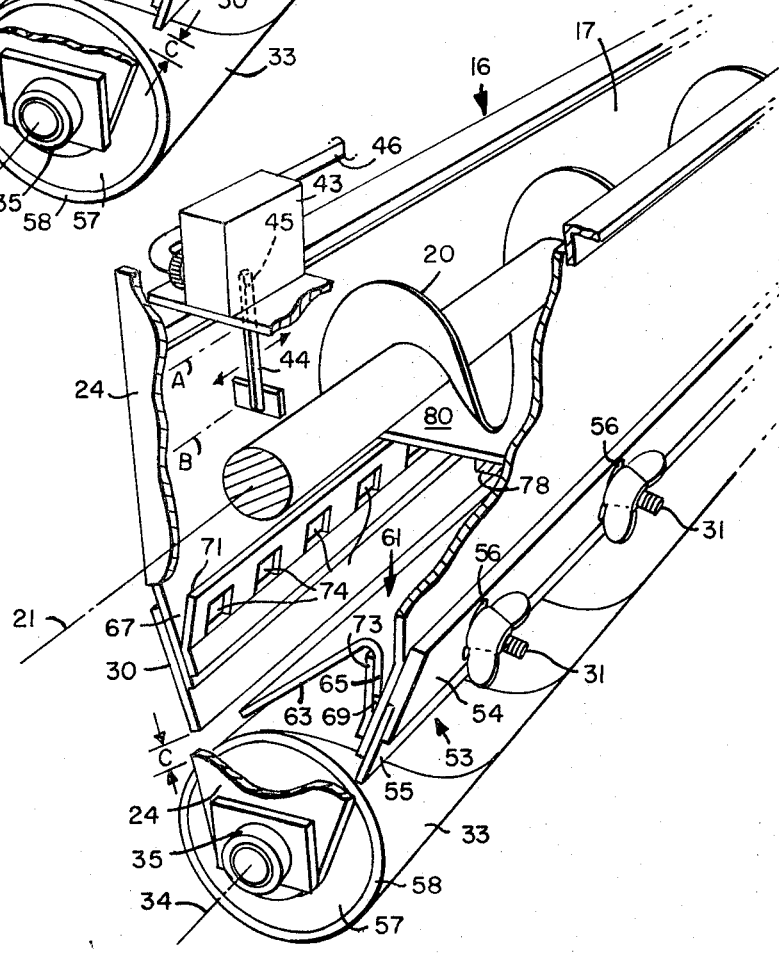

GRANULATE SPREADER APPARATUS

BACKGROUND OF THE INVENTION

The present invention relates to apparatus for spreading a mat of granulate matter, such as sand and gravel, evenly and uniformly over a given planar surface. Applications for the apparatus may include spreading a mat of gravel over a road bed surface to create a coarse skid resistant surface. For example, frequently, it is desirable that the roadway surface of a highway bridge be coarse to provide skid-resistance to automobiles traveling over the surface. Also it is frequently desirable that the surface of roadway curves be skid-resistant to discourage the tendency of automobiles to skid laterally while manuevering the turn. In establishing such skid-resistance surfaces it is common to first apply a liquid adhesive substance, e.g., tar, over the roadway surface. While the tar is still in a liquid state, a mat of sand or gravel is spread over the surface. As the tar solidifies, the granulate particles, which are partially submerged in the tar, are set and secured in place. That portion of the granulate particles protruding above the tar surface provides a coarse roadway surface. In establishing the coarse surface, it is necessary that the mat be uniform and even such that the exposed surface is of relatively uniform coarseness.

In constructing skid-resistant highway surfaces, it has heretofore been common practice to first apply a layer of liquid adhesive (tar) over the roadbed surface. Then a mat of sand and gravel is distributed over the layer of liquid tar by man-labor and shovels. The individual laborers, while standing to the side of the roadway surface, repeatedly throw the sand or gravel from their shovels in the air out over the surface so that the particles freely fall to the surface. This method of distributing the gravel or sand and building up the mat requires a considerable number of individual laborers capable of rapidly and efficiently distributing the sand or gravel prior to the time the liquid tar solidifies. This method requires considerable skill on the part of the laborers to establish an even and uniform mat. In distributing the gravel and sand, it is preferably that the particles fall vertically toward the liquid tar surface, without significant lateral motion so as to discourage rolling of the particles laterally along the surface once the particles contact the surface. Preferably, the particles, upon making contact with the adhesive tar substance, should immediately come to rest without rolling or sliding in any lateral direction across the planar surface.

SUMMARY OF THE PRESENT INVENTION

The present invention provides for spreader apparatus adapted to evenly and uniformly spread a mat of granulated particles over a given surface. The apparatus is adapted such that granulate particles, e.g. sand or gravel, are evenly and uniformly spread across the lateral dimension of the given surface as the apparatus is moved at a uniform rate relative to the longitudinal dimension of the surface. For example, when used to distribute a mat of gravel over a roadway surface, the apparatus may be mounted on a truck vehicle. As the truck vehicle is driven along side the roadway surface, the apparatus projects laterally across said surface, and gravel is disposed uniformly and evenly over the lateral and longitudinal dimensions of said roadway surface to establish a uniform mat.

The spreader apparatus provides an automated means for distributing a mat of granulate matter which is substantially faster and more economical than by the use of hand-labor. At the same time, relatively inexperienced and unskilled individuals may operate the apparatus.

An exemplary embodiment of the spreader apparatus includes a base support member mounted on a vehicle such as a flatbed truck. The base support member is engaged to a bulk hopper. The bulk hopper is adapted to carry a bulk supply of granulate matter, e.g., gravel, to be distributed over the given surface, e.g., roadbed. An elongated housing is engaged to the bulk hopper and projects laterally from the bulk hopper. The housing forms an elongated trough extending laterally from the truck and elevated directly above the roadbed surface. Passage means is provided between the bulk hopper and the interior of the trough to permit the gravel to fall, under the force of gravity, from the bulk hopper to one end of the trough. An elongated rotational conveyor screw is housed within the trough and extends end-to-end of the trough from said passage means. The conveyor screw is positioned to receive gravel passing through the passage means and rotate about an axis parallel to the trough. As the conveyor screw rotates, it conveys the gravel laterally within the trough. Once the trough is at least partially filled laterally end-to-end with gravel, the gravel is in condition for disposal over the roadway surface. Discharge of the gravel from the trough is controlled by control gates engaged to the housing about the bottom side of the trough. Accordingly, as the control gates are opened, gravel falls, under the force of gravity, from the trough towards the roadway surface. Rotation of the conveyor is continuously controlled to retain a supply of gravel laterally throughout the trough. The housing further supports an elongated roller immediately beneath the trough and at an elevated position relative to the roadbed surface. The roller rotates about an axis parallel to the trough and is positioned such that as gravel is discharged through the gates, the gravel falls to the surface of the rotational roller. As the rotating roller receives gravel, it further controls the uniform distribution of the gravel particles. The direction of rotation of the roller is controlled such that the lateral motion imparted to the particles by the vehicle is offset by the lateral movement imparted to the particles by the roller. Thus, as the gravel particles fall from the roller surface toward the roadway surface, the particles have a net lateral motion of substantially zero. This in turn, discourages the gravel particles from rolling along the roadbed surface once the particles contact the liquid adhesive matter spread over the surface.

BRIEF DESCRIPTION OF THE DRAWINGS

FIG. 4 is an end view of the housing and trough of the apparatus of FIG. 1 taken along the line 4—4;

FIG. 5A illustrates a partially sectioned end view of the apparatus of FIG. 1 with an internal directional guide placed for accomodating one direction of relative longitudinal movement of the apparatus; and FIG. 5B illustrates a partially sectioned view of the apparatus of FIG. 1 with the internal directional guide reversed and placed for accomodating the other direction of relative longitudinal movement of the apparatus.

DESCRIPTION OF THE PREFERRED EMBODIMENT

Figure 1:
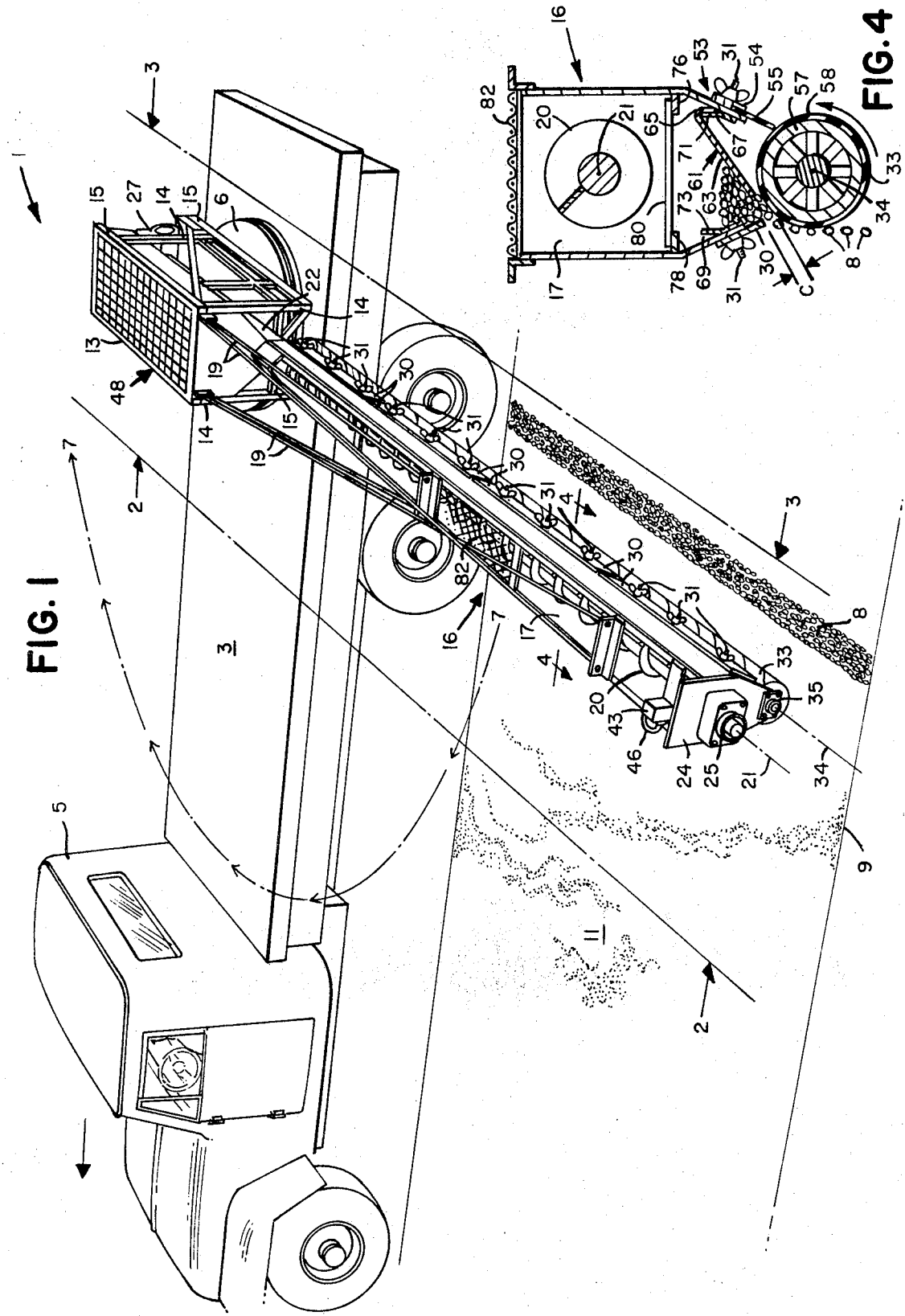
FIG. 1 is a perspective view illustrating a spreading apparatus of the present invention mounted on a truck vehicle and adapted for disposing a mat of gravel over a roadway surface.
Figure 2:
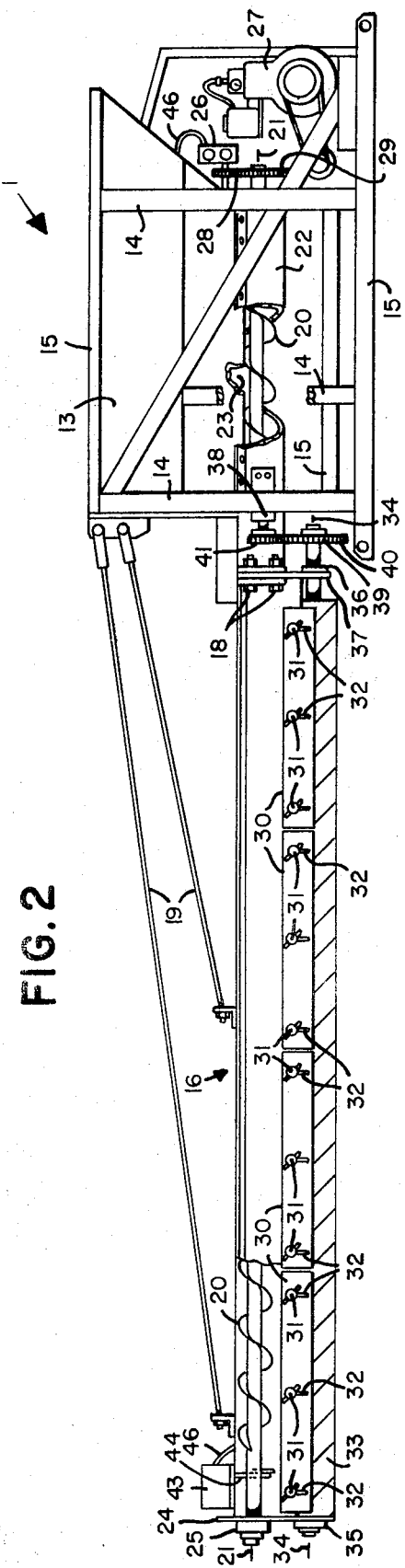
FIG. 2 is a side view of the apparatus of FIG. 1 viewing the apparatus along lines 2—2 of FIG. 1.
Figure 3:
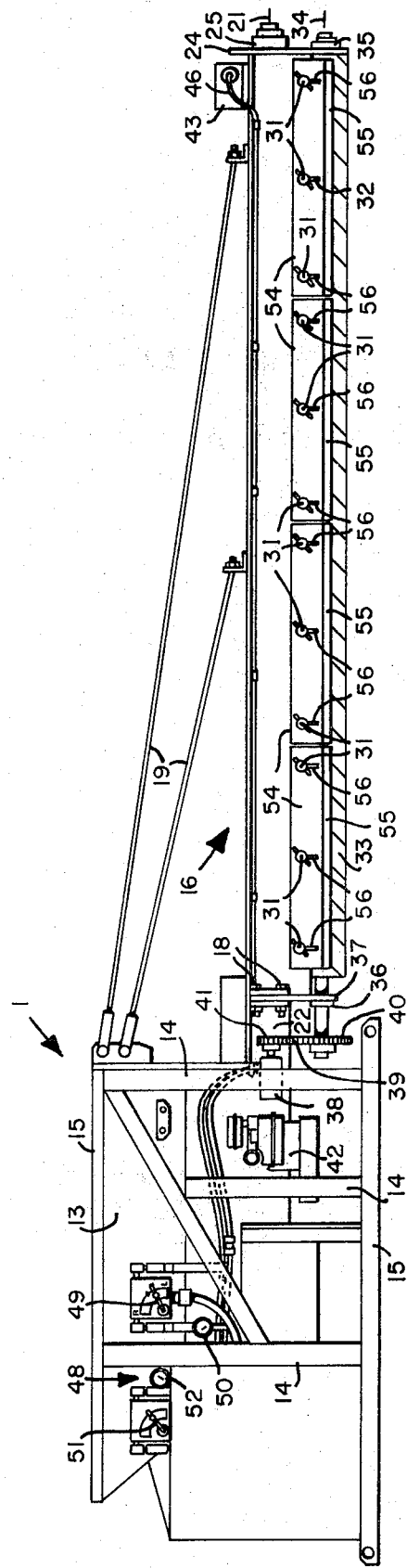
FIG. 3 is a side view of the apparatus of FIG. 1 viewing the apparatus along line 3—3 of FIG. 1.

FIG. 1 depicts spreader apparatus of the present invention as utilized in combination with a vehicular carrier for spreading a mat of gravel across the roadbed surface of a highway to establish a skid-redistant surface. The spreader apparatus, referred to by the general reference character 1 is mounted on a flatbed 3 of a truck 5. The spreader apparatus 1 includes a base 6 in the form of a turntable supported to the bed 3 so as to permit the apparatus 1 to be rotated 180° about an axis normal to the bed 3 as illustrated by the line 7—7. The spreader apparatus 1, as illustrated, is utilized for spreading a mat of gravel 8 over a roadbed surface 9. In transport, the apparatus 1 may be positioned so as not to project laterally from the roadbed. In operation, the apparatus may project laterally from either side of the truckbed 3. In preparing the skid resistant roadbed surface 9, the gravel 8 is spread over the surface immediately after the surface has been treated with a layer of liquid tar 11 and while the tar 11 is in the liquified state. After the gravel is spread and the tar solidifies, the individual gravel particles become permanently embedded in the tar establishing a coarse surface tending to resist skidding of automobiles traveling over the surface. In normal applications it is necessary that the gravel mat 8 be spread within a few minutes after the tar is applied to the roadbed surface 9. During the gravel spreading operation, it is necessary that the truck 5 be driven along a path adjacent to the surface carrying the liquified tar to avoid contact of the truck wheels with the liquid tar. Accordingly, as the vehicle 5 is driven along side the roadbed surface 9, a mat of gravel is spread laterally and longitudinally over said surface.

The spreader apparatus 1 includes a bulk hopper 13 for receiving a supply of gravel. The bulk hopper 13 is mounted on the turntable 6 which is directly supported by the bed 3. A plurality of vertical support columns 14 and horizontal support members 15 support the hopper 13 in place. The hopper 13 carries tapered sidewalls and vertical endwalls such that gravel is urged to migrate towards the bottom of the hopper under the force of gravity. Projecting laterally from the bulk hopper 13 and engaged to one endwall of the bulk hopper is an elongated housing 16. The housing 16 is adapted to extend laterally from the bulk hopper 13 out over the roadbed surface 9. The housing may be in the order of approximately twelve feet in length and forms an elongated feeder trough 17. The trough 17 is formed by the end and sidewalls of the housing 16. The housing 16 is supported by the hopper 13 by means of a plurality of bolts 18. A plurality of support arms 19 inter-engage the housing 16 and hopper 13 to provide further structural support and stability to the housing.

Within the interior of the elongated feeder trough 17, and near its top surface, is an elongated conveyor screw 20 extending end-to-end of the trough 17. The screw 20 is rotatable about an axis 21. The screw 20 also extends beneath the bottom side of the bulk hopper 13 within an arcuate housing 22. The conveyor screw 20 may include a plurality of flights spaced approximately six inches tip-to-tip and of approximately six inches in diameter. The individual flights are tapered so as to urge gravel laterally along the trough 17 as the conveyor is rotated about the axis 21. The housing 22 functions as a receiving zone for receiving gravel passing through a passageway 23 from the bulk hopper. The received gravel within the housing 22 may then be conveyed from said housing by the conveyor screw 20. The screw 20 extends end-to-end of the arcuate housing 22 and is journaled to an endwall 24 of the housing 16 by means of a journal 25. The screw 20 is adapted such that as the screw is rotated it draws gravel through the housing 22 to the trough 17. As gravel is drawn from the arcuate housing 22 by the screw 20, a continuous supply passes through the passageway 23 from the bulk hopper 13, to the housing 22 and to the feeder trough 17. The conveyor screw 20 is rotationally driven about the axis 21 by a hydraulic motor 26 in turn driven by a gasoline motor 27. The motor 26 is coupled to the conveyor screw 20 by means of a drive belt 28 in turn coupled to a sprocket 29 journaled to the shaft of the screw 20. As the conveyor screw 20 urges gravel from the housing 22, the trough 17 tends to fill vertically and laterally with gravel.

A plurality of control gates 30 are engaged to one side of the housing 16 about the bottom side of the trough 17 so as to provide a controlled passage means for gravel passing from the trough 17 for distribution on the roadway surface. The gates 30 are each engaged to a plurality of adjustable fasteners 31 secured about the sidewalls of the housing 16. The fasteners 31 are adapted for alignment with oblong slots 32 within the gates such that the vertical position of the gates may be controlled. The gates 30 may be rapidly and easily adjusted about or removed from the fasteners 31. As illustrated, and hereinafter discussed, the gates 30 may be positioned on either side of the housing 16.

Mounted on the housing 16 and beneath the control gates 30 is an elongated roller 33. The roller 33 is rotatable about an axis 34 which is parallel with and in vertical alignment with the axis 21 of the conveyor screw 20. The roller 33 is positioned to receive gravel particles discharged about the bottom side of the trough 17. The roller 33 is supported about one end by a journal 35 integral with the end plate 24 and is supported about the other terminal end by a journal 36 supported by a plate 37. The roller 33 is rotationally driven by a bi-directional variable speed, hydraulic motor 38 coupled to the roller 33 by means of a drive chain 39. The drive chain 39 is engaged to a sprocket 40 in turn, engaged to the roller 33. The chain 39 is also engaged to a sprocket 41 coupled to the motor 38. The hydraulic fluid to the motor 38 is in turn pumped by a gasoline engine 42. The hydraulic motor 38 is adapted to be bi-directional so as to be capable of driving the roller 33 in either rotational direction about the axis 34. The use of a hydraulic motor has been found to provide a uniform constant speed of rotation and which provides a high acceleration to the steady state speed of rotation when activated. A uniform steady state rate of rotation with a high acceleration is desirable to establish a uniform mat during operation.

About the far terminal end of the housing 16 is a spring loaded limit switch 43. The switch 43 is adapted to serve as a sensing means for sensing the level of granulate matter within the trough 17. The limit switch 43 includes an arm 44 in the shape of a paddle extending within the trough 17. The paddle arm 44 is rotational about a pivot pin 45 and continuously responds to the level of gravel about the far end of the trough 17. Thus, as the conveyor screw 20 conveys gravel from the bulk hopper 13 to the trough 17 and as gravel is released by the control gates 30, the level is continuously sensed. The limit switch 43, by means of a cable 46, is electrically engaged to the hydraulic motor 26. Thus as the accumulated gravel within the far end of the trough 17 increases and reaches a pre-determined level, e.g., level A (FIG. 5A and 5B) the limit switch 43 senses that level and inturn interrupts the motor 25 thereby discontinuing rotation of the conveyor screw 20. This prevents the trough 17 from overflowing with gravel when the rate of release of gravel from the trough is less than the rate the screw 20 loads the trough. In operation, as gravel is released through the gates 30, the paddle 45, due to the spring load on the arm, continuously rests on the top level of the gravel. With the gravel level below a pre-determined minimum level, e.g., level B (FIGS. 5A and 5B) the limit switch 43 reactivates the hydraulic motor 26 and rotation of the conveyor screw. The conveyor screw 20 in turn draws more gravel from the bulk hopper 13 to replenish the supply within the trough 17 and continues to do so until the level reaches the predetermined maximum level A. Thus, the level of gravel throughout the trough 17 in continuously maintained below the predetermined maximum level A and gravel is continuously supplied to the trough 16 when the level is below the predetermined minimum level, e.g., level B.

The control gates 30 are adapted such that the terminus lateral edge of the gates, may be positioned to provide a spacing "C" between the edge of the gates and the surface of the roller (see FIG. 4). The degree of the opening "C" controls the rate of discharge of gravel flowing from the trough 17 and the surface of the roller 33. The individual operator presets the degree of the opening "C" dependant on the size of the gravel particles and the depth of the mat of gravel to be disposed on the roadway surface. The opening "C" is set and controlled by the fasteners 31 and the apertures 32 of the gates 30.

A control panel 48 is mounted about the exterior of the bulk hopper 13. The control panel 48 provides a single control station at which an operator may control the roller 33 and conveyor screw 20. The speed of rotation of the roller 33 is controlled by a control 49 and indicated by a tachometer 50. The speed of rotation of the conveyor screw 20 is controlled by a control 51 and indicated by a tachometer 52. The direction of rotation of the roller 33 is indicated by the position of the control 49. The direction and rate of rotation of the roller 33 is controllable in either direction and is selected dependent upon the relative direction and rate of movement of the truck 5 and the lateral side from which the housing 16 projects. The speed and direction of rotation of the roller 33 is selected such that as the truck 5 moves along side the roadbed, the net lateral speed of the gravel particles, as they drop from the roller 33 is substantially zero. For example, as the particles fall from the trough 17 towards the roller 33, the particles have lateral movement due to the lateral movement of the truck 5. When the particles contact the surface of the rotating roller 33, the roller imparts lateral movement due to the rotation of the roller. With the roller 33 imparting an opposite force to the particles from that imparted by movement of the truck 5, it in turn, permits the particles to descend from the surface of the roller 33 in a substantially direct vertical fall towards the roadbed and once the particles contact the liquid tar surface they are partially embedded in the tar and stay in place. It has been found that where the net lateral movement of the particles in their fall from the roller surface is not substantially zero, the particles tend to roll laterally after initially contacting the tar surface. Upon coming to rest after said roll, the particles are not embedded in the tar to the degree they are without any roll. Also, by rolling, the particles accumulate a tar film which is undesirable.

The housing 16 also supports a flat, rectangular, flexible lag member 53 comprised of a metal strip 54 and pliable rubberized strip 55. The strip 55 is bonded to the metal strip 53. The metal strip 53 includes a plurality of apertures 56. The apertures 56 are positioned for alignment with fasteners 31 such that the lag member 53 may be secured to a sidewall of the housing 16. The lag member 53 during operation, is positioned on the opposite wall from that of the gates 33. In position, as illustrated in FIGS. 5A, 5B and 4, the lag member 53 discourages gravel from being discharged from the roller 33 surface without passing through the opening "C."

The roller 20 may be constructed of a steel cylinder 57 with a rubber coating 58 (See FIG. 4). The coating 58 may be secured to the cylinder 57 by means of an epoxy glue. The rubber coating provides for a resilient coarse surface for contacting the gravel particles as they fall to the roller surface.

The interior of the trough 17 may further support a directional guide to further aid in directing the gravel particles to one lateral side of the roller 33 as the particles are released through the trough 17. The directional guide is illustrated in the form of an inverted V-shape deflection guide 61. The guide 61 has a first elongated flat planar surface 63 and a second elongated flat planar surface 65. The surface 65 is adapted to engage a slot 67 or a slot 69, respectively formed on opposite sidewalls of the trough 17 by a pair of ribs 71 and 73. The ribs 71 and 73 each carry a plurality of apertures 74 to permit gravel to penetrate. FIGS. 4 and 5A illustrate the guide 61 positioned in the slot 67 to guide release of gravel towards the rear side of the roller 33. With the guide 61 in this position, the roller 33 is rotated clockwise such that at the initial point of contact of the gravel and roller surface, the roller tends to urge the gravel in the opposite lateral direction from the direction of movement of the entire apparatus 1. For example, assuming as illustrated in FIG. 1 that the apparatus 1 is projecting from the left side of the truck bed 3 and the truck 5 is driven forward, then the roller 33 is driven clockwise and the guide plate 61 is positioned in the slot 67 as shown in FIG. 5A. Also, the control gates 30 are psitioned with the opening C to one lateral side of the roller 33. The rotational speed of the roller 33 is selected such that the net lateral motion of the gravel particles 8 is substantially zero as the particles fall to the roadbed surface from the surface of the roller 33 after passing through the opening "C."

FIG. 5B illustrates the guide plate 61 positioned in the slot 69 to accomodate the apparatus 1 when it is moved in the opposite relative direction from that of FIG. 5A. As illustrated in FIG. 5B, to accomodate this direction of movement of the apparatus 1, the direction of rotation of the roller 31 is driven counterclockwise. For example, with the apparatus 1 projecting from the right side of the truck bed 3 and the truck 5 driven forward, the roller 33 is driven counterclockwise. In the illustrated embodiment of the guide plate 61, an individual may conveniently insert and remove the guide plate 61 from the slots 67 and 69 depending on use of the apparatus 1. The individual merely slides the guide plates 61.

The apparatus 1 is further adapted such that the lateral width of the mat may be controlled by controlling the width of the pass from the trough 17. In various applications the lateral width of the surface to be covered with gravel, is less than the length of the trough 17. The housing 16 supports a pair of support studs 76 and 78 on interior sidewalls of the housing 16 (See FIG. 4). The studs 76 and 78 are adapted to receive and support a cut-off plate 80. The plate 80 fits within the trough 17 beneath the screw 20 and over the studs 76 and 78. In position, the plate 80 precludes flow of gravel from the trough 16. The studs 76 and 78 extend longitudinally the entire length of the trough 17. The plates 80 may be selected of any desired length depending on the width of the desired mat and pass. For example, assuming the trough 17 to be 12 feet in length, and a pass of 6 feet is desired, a 6 foot long stop plate 80 may be inserted.

The housing 16 further supports a cover 82 in the form of a screen. The cover 82 is positioned about the top of the housing 16 to discourage large undesirable particles from entering the trough 17.

Accordingly, the present invention provides for an automated spreader apparatus adapted to dispose a layer of gravel or sand of a desired depth and width.

Apparatus according to the present invention may also be used in other applications for the spreading of granulate particles. For exampe, the apparatus may be used in spreading rock granules in the manufacture of asphalt shingles. In the manufacture of said shingles, sheets of felt are saturated with hot liquid asphalt. Fine rock granules are then embedded in the asphalt coating to add fire resistance, to prolong the life and to add color to the shingles. The present apparatus may be utilized in the spreading of said rock granules to said saturated felt sheets. In such operation the sheets are moved relative to the spreader apparatus to create the mat.

I claim:
1. Spreader apparatus for uniformly spreading a granulate matter over a surface comprising, in combination:
 a base support member;
 a bulk hopper for carrying a supply of granulate matter to be distributed over a given surface, the bulk hopper being engaged to the base support member;
 an elongated housing engaged to the bulk hopper and projecting laterally from the hopper and forming an elongated trough along a common longitudinal axis;
 first passage means extendng intermediate the interior of the bulk hopper and said trough to permit granulate matter to flow from the bulk hopper to said trough;
 conveyor means supported by said elongated housing and extending across the trough from said passage means for conveying granulate matter passed through said passage means to within said trough;
 an elongated rotational roller means supported by said elongated housing beneath said conveyor means and about said bottom side of said trough, the axis of rotation of the roller being parallel with said common longitudinal axis;
 drive means for driving said conveyor means and for driving said roller means rotationally about its axis; and
 control gate means intermediate the conveyor screw and the roller for controlling the rate of release of granulate matter from said trough and said roller.

2. The spreader apparatus of claim 1 in which the roller means is positioned with its axis of rotation in substantial vertical alignment with said common longitudinal axis.

3. The spreader apparatus of claim 2 in which said drive means is coupled to said roller means for driving said roller means in either rotational direction.

4. The spreader apparatus of claim 1 in which the conveyor means is in the form of a conveyor screw positioned within said trough and rotatable about an axis parallel with said common axis, the screw including a plurality of spaced flights for urging granulate matter from said passage means to within said trough.

5. The spreader apparatus of claim 3 in which the housing carries an opening about its bottom side for passage of particulate matter to the surface of the roller.

6. The spreader apparatus of claim 5 in which the control gate means includes adjustment means for controlling the degree of opening intermediate the surface of the roller and the gate means.

7. The spreader apparatus of claim 5 including an elongated deflection member within the housing to deflect granulate matter passing from the trough to one lateral side of said roller.

8. The speader apparatus of claim 7 in which the drive means includes means for rotating said roller bi-directionally about its axis of rotation.

9. The spreader apparatus of claim 8 further including
 a lag member supported by said housing intermediate the surface of the roller and the bottom opening of said housing for discouraging discharge of particulate matter from said trough, the lag member being positioned substantially parallel to and laterally from said control gates.

10. The spreader apparatus of claim 9 in which the control gates are releasable from the housing, the lag member is releasable from the housing and said lag member and control gates are interchangeable with one another.

11. The spreader apparatus of claim 1 in which the base support member includes a turntable with said elongated housing being pivotable with said turntable.

12. The spreader apparatus of claim 8 in which the drive means for the roller is in the form of a hydraulic motor.

13. The spreader apparatus of claim 1 further including a stop means within said trough for blocking passage of granulate matter from select sections of said trough towards said roller.

14. Spreader apparatus for spreading a mat of granulate matter over a surface, the apparatus comprising, in combination:
   a mobile mover for traveling adjacent to a surface over which a mat of granulate matter is to be spread;
   a base support member supported by said mover;
   a bulk hopper for carrying a bulk supply of said granulate matter, the bulk hopper being engaged to the base support member;
   an elongated housing engaged to the bulk hopper and projecting laterally from the hopper, the housing forming an elongated trough along a common longitudinal axis and adapted to project horizontally over said surface and elevated relative to said surface;
   first passsage means extending intermediate the interior of the bulk hopper and said trough to permit granulate matter to flow from the bulk hopper to said trough;
   conveyor means supported by the elongated housing and extending across the trough from said passage means for conveying granulate matter passed through said first passage means to within said trough;
   an elongated rotational roller means supported by said elongated housing beneath said conveyor means, the axis of rotation of the roller being parallel with said common longitudinal axis;
   second passage means intermediate said trough and said roller to permit granulate matter to flow from said trough to the surface of the roller;
   drive means for driving said conveyor means and for driving the roller means rotationally about its axis; and
   control gate means intermediate the conveyor screw and the roller for controlling the rate of release of granulate matter from said trough and roller toward said surface.

15. The spreader apparatus of claim 14 in which
   the conveyor means is in the form of a conveyor screw positioned within said trough and extending substantially the lateral length of said trough from said first passage means; and
   granulate level sensing means for sensing the level of granulate matter within said trough, said level sensing means being engaged to the conveyor screw drive means for controlling actuation of the conveyor means responsive to the sensed level.

16. The spreader apparatus of claim 15 in which
   the elongated roller is bi-directionally rotatable about its axis of rotation, and the drive means for driving the roller is adapted for driving the roller bi-directionally;
   the control gate means includes adjustable gates for controling the degree of opening of the second passage means; and
   granulated deflection means supported by said housing for deflecting granulate matter passing through said second passage means to one lateral side of the roller.

17. The spreader apparatus of claim 16 in which
   the control gate means establishes an opening intermediate the roller surface and the trough about one lateral side of the roller; and further including
   a lag member extending from the housing to the surface of the roller to block passage of granulate matter from the other lateral side of roller.

18. The spreader apparatus of claim 17 further including
   a stop plate member having a length less than the length of said trough, the stop plate member being positioned within said trough intermediate the conveyor screw and said second passage means to discourage flow of granulate matter through said second passage means.

19. The spreader apparatus of claim 14 in which
   the base member includes a turntable with said elongated housing being pivotable with the turntable relative to the mobile mover.

20. The spreader apparatus of claim 16 in which
   the drive means for the roller is a bidirectional hydraulic motor.

21. The spreader apparatus of claim 20 in which
   the roller includes a resilient surface coating.

* * * * *